United States Patent [19]

Nakayama et al.

[11] Patent Number: 5,361,143
[45] Date of Patent: Nov. 1, 1994

[54] FACSIMILE APPARATUS

[75] Inventors: Tsutomu Nakayama, Yokohama; Kunio Shijo, Chigasaki; Takashi Murahashi, Hino, all of Japan

[73] Assignee: Konica Corporation, Tokyo, Japan

[21] Appl. No.: 944,311

[22] Filed: Sep. 14, 1992

[30] Foreign Application Priority Data

Oct. 2, 1991 [JP] Japan .................. 3-255508

[51] Int. Cl.⁵ .............................. H04N 1/00
[52] U.S. Cl. .................... 358/500; 358/400
[58] Field of Search ............... 358/500, 501, 504, 505, 358/515, 524, 529, 530, 400, 401, 406, 443, 448, 468

[56] References Cited

U.S. PATENT DOCUMENTS

| | | |
|---|---|---|
| 4,274,111 | 6/1981 | Murase . |
| 4,739,397 | 4/1988 | Hayashi . |
| 4,862,254 | 8/1989 | Takada . |
| 4,980,760 | 12/1990 | Hiratsuka et al. . |
| 5,262,851 | 11/1993 | Nakatani et al. . |
| 5,276,509 | 1/1994 | Mizuno et al. . |
| 5,289,296 | 2/1994 | Yamada . |

FOREIGN PATENT DOCUMENTS

| | | |
|---|---|---|
| 0052184 | 5/1982 | European Pat. Off. . |
| 4034540A1 | 5/1991 | Germany . |
| 2240234 | 10/1990 | United Kingdom . |

OTHER PUBLICATIONS

Patent Abstracts of Japan, Publication No. JP3174877, Jul. 30, 1991.

*Primary Examiner*—Bentsu Ro
*Attorney, Agent, or Firm*—Finnegan, Henderson, Farabow, Garrett & Dunner

[57] ABSTRACT

A facsimile apparatus for tele-copying an original image has reading means to read a multi-color original image so as to obtain plural sets of color image data and a set of integrated image data. Each set of the color image represents an image of a color in the muti-color image and the integrated image is a total image formed by all colors of the multi-color image. Memeory means of the apparatus separately stores each image data set. In transmitting the image data to a receiving station, a transmitter of the apparatus selects necessary data sets from the stored image data sets based on printing capability of the receiving station and transmits only the selected data sets.

3 Claims, 6 Drawing Sheets

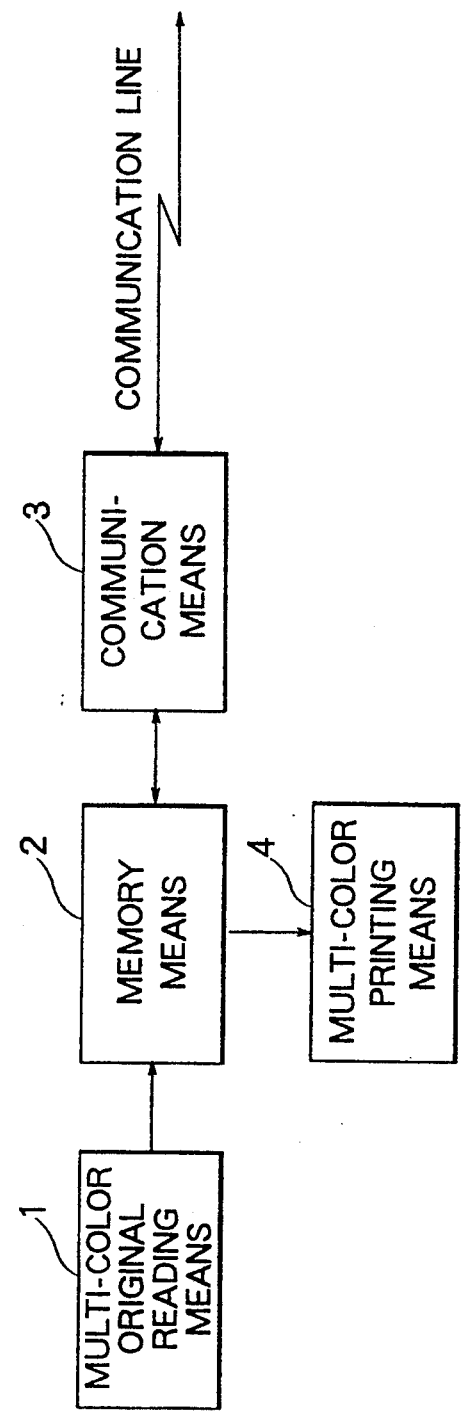

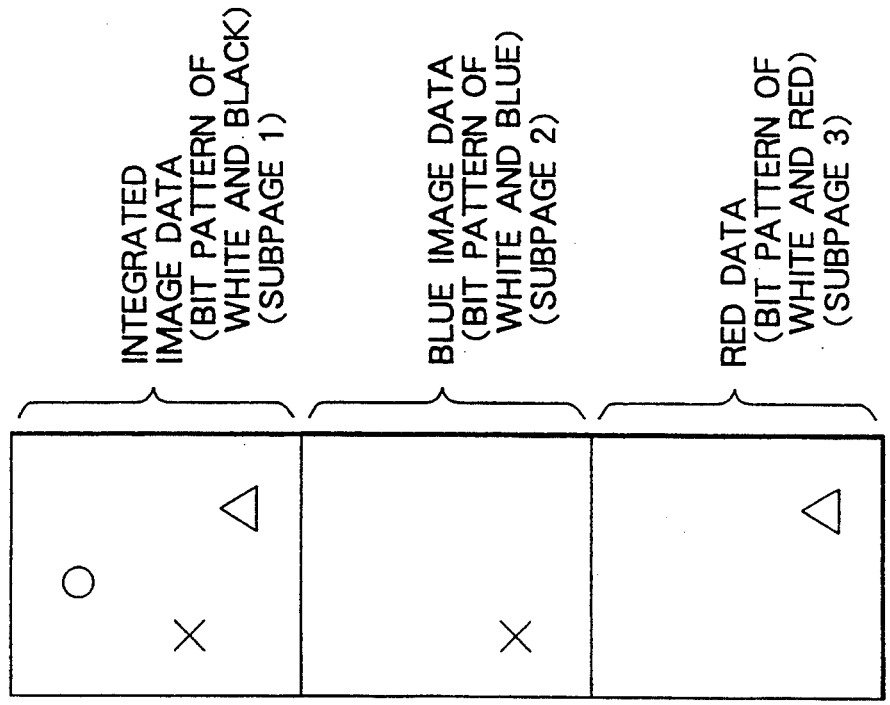
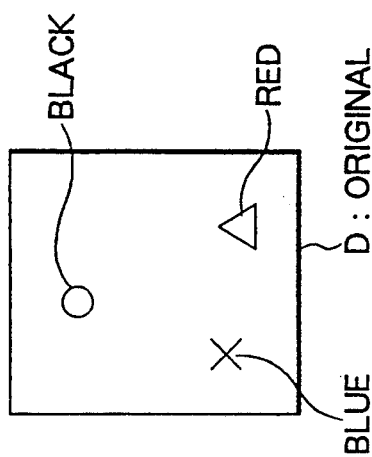

FACSIMILE APPARATUS

BACKGROUND OF THE INVENTION

The present invention relates to a facsimile apparatus capable of transmitting a multi-color original, and more particularly, to a facsimile apparatus capable of transmitting contents of a multi-color original surely even to the other party (a receiver) which has no multi-color printing capability.

As a facsimile apparatus capable of transmitting contents of a multi-color original, there have been known a facsimile apparatus for two colors of red and black in a G2 (Group 2) equipment and a facsimile apparatus of a line sequential transmission system or a page sequential transmission system in a G3 (Group 3) equipment.

A facsimile apparatus for two colors of red and black in a G2 equipment employs analog signals for transmission and receiving. Therefore, it has no interchangeability with a G3 equipment of a digital transmission system used widely at present, which is inconvenient.

In a facsimile apparatus of a page sequential transmission system in a G3 equipment, on the other hand, contents of one page of an original are transmitted by colors. Therefore, when the other party (a receiver) has no multi-color printing capability, data in each color are printed on a different page as bit pattern of black and white, which has been a problem.

When transmitting after preparing monochromatic data at a transmitter for the purpose of preventing the aforementioned problem, it is required to prepare the monochromatic data on a real time basis while conducting communication. However, image data are coded for each color, and therefore it is not possible to prepare the monochromatic data unless image data of each color are read and decoded, which has been a problem.

In the case of a facsimile apparatus of a line sequential transmission system, it is not possible to restore original data at the other party when the other party has no multi-color printing capability, which is the same as in the case of a facsimile apparatus of a page sequential transmission system. When transmitting after preparing monochromatic data at the transmitter for the purpose of overcoming the problem mentioned above, the complicated processing is required.

Further, in the line sequential transmission system, data in a line are transmitted for each color. Therefore, correlation of data in a line is broken, making efficient data transmission impossible when an ordinary MH coding system or MR coding system is employed.

In addition to the above the line sequential transmission system has a problem of poor efficiency when transmitting data to an apparatus where received data are printed after being stored therein temporarily as in a printing apparatus suitable for the page sequential printing, such as, for example, an electrophotographic printing apparatus.

SUMMARY OF THE INVENTION

The above-mentioned problems have been solved in the present invention and the invention provides a facsimile apparatus capable of communicating with a G3 equipment and of transmitting surely the contents of a multi-color original even to the other party having no multi-color printing capability.

In order to solve the problems mentioned above, a facsimile apparatus of the invention is provided with a reading means that reads all data on one page of a multi-color original as integrated data using the same color or each color and also reads separately each color data, a memory means that stores separately the integrated data and each color data both of which have been read by the reading means, and a transmitting means that transmits data stored in the memory means to the other party, so that it may be possible to transmit the integrated data only when the other party is not capable of printing on a multi-color basis.

BRIEF DESCRIPTION OF THE DRAWINGS

FIG. 1 represents a block diagram of functions of a facsimile apparatus related to the invention, FIG. 2, including FIGS. 2a and 2b, is an illustration diagram that illustrates how multi-color original data are read.

DETAILED DESCRIPTION OF THE INVENTION

Figure 3:
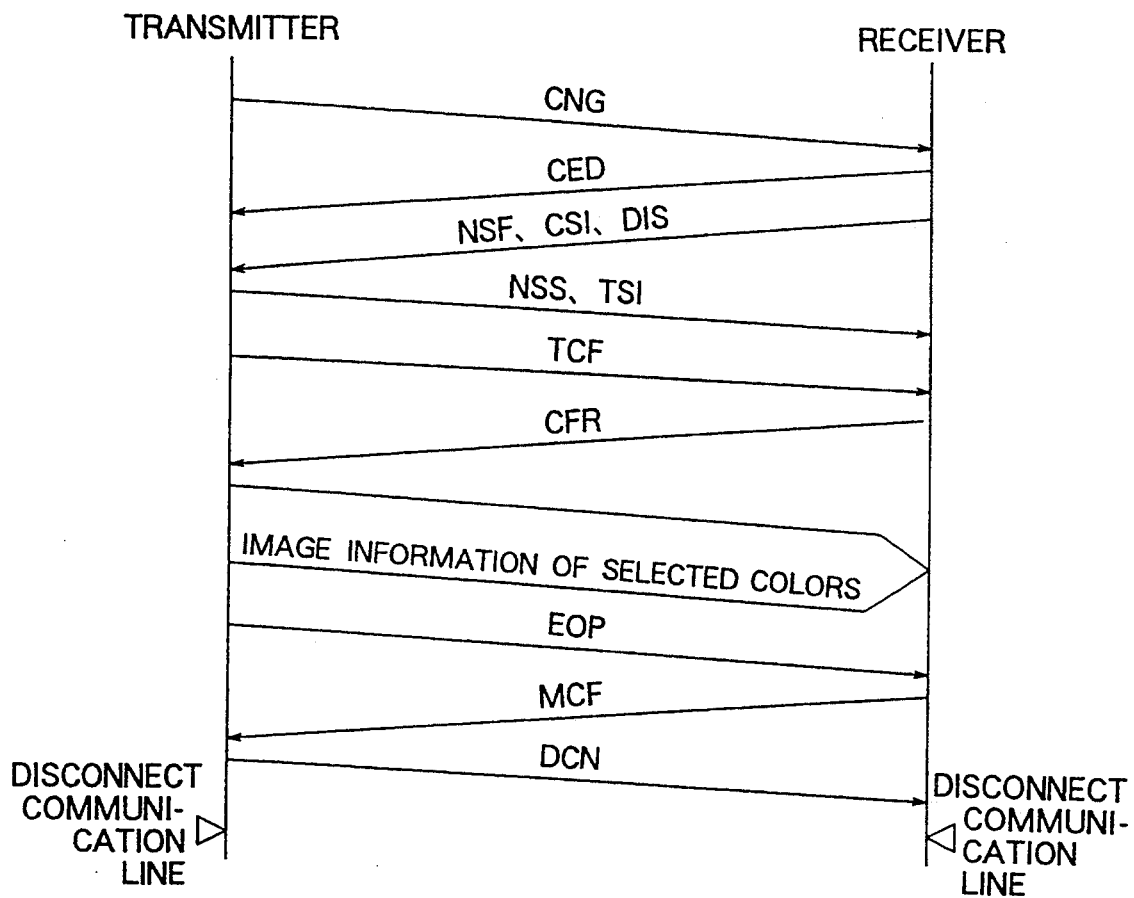
FIG. 3 is an illustration diagram that illustrates how multi-color original data are transmitted.

In FIG. 1, when transmitting a multi-color original data, the original is read by multi-color original reading means 1. In this case, integrated data for one page of the original as shown in FIG. 2-a are read first as total black data as shown in FIG. 2-b (subpage 1), then a blue portion is read as blue data (subpage 2) and a red portion is finally read as red data (subpage 3).

Three data sets obtained in the above method of reading are stored in memory means 2, and they are transmitted to the other party by means of communication means 3.

In this case, when it is judged by means of NSF signals (FIG. 3) received from the other party that the other party has multi-color printing capability, the integrated data and data of each color are transmitted in succession. Thus, multi-color data are printed at the other party.

When the other party has no capability for multi-color printing, integrated data only are transmitted. Thereby, the other party can print all data from a transmitter as a bit pattern of black and white.

An example of a facsimile apparatus of the invention will be explained in detail as follows, referring to the drawings.

FIG. 1 shows a block diagram of functions in the present invention. In the figure, 1 represents multi-color original reading means, When reading a multi-color original such as, for example, original D having thereon three colors of black, red and blue as shown in FIG. 2-a, data of all colors are first read in black as subpage 1 as shown in FIG. 2-b, then a blue portion only is read in blue as subpage 2 and after that, a red portion only is read in red as subpage 3.

Namely, in the multi-color original reading means 1, when one page of an original has thereon data of three colors in black, red and blue, the original is read as a long original having subpages 1, 2 and 3 and corresponding to three pages in length.

In FIG. 1, the numeral 2 is a memory means, and data for each of subpages 1-3 read by the multi-color original reading means 1 are stored in each area in the memory means. The numeral 3 is a communication means and it is connected to communication lines and conducts coding of data stored in the memory means 2 through an MH coding system or an MR coding system for transmission thereof to the other party and receives data transmitted from the other party.

Data received from the other party are stored in the memory means 2 temporarily, and the data are printed by means of multi-color printing means 4. As printing means 4, an ordinary printing means capable of printing on a multi-color basis may be used and its detailed explanation will be omitted.

FIG. 3 shows transmission sequence of multi-color data in the above-mentioned facsimile apparatus. In the figure, a transmitter transmits first CNG signal (calling tone) to a receiver, and then a receiver sends out CED signal (called station identification), NSF signal (non-standard facilities), CSI signal (called subscriber identification) and DIS signal (digital identification signal). NSF signal includes information relating to whether the receiver has capability of multi-color printing or not.

Then, the transmitter sends NSS signal (non-standard facilities setup), TSI signal (transmitting subscriber identification) and TCF signal (training check signals). FIF (facsimile information field) of the NSS signal includes information showing that a transmitter conducts transmission on a multi-color mode.

After receiving the aforementioned information, the receiver sends CFR signal (confirmation to receive), then the transmitter sends, for example, image information of three colors. Color of image information to be transmitted may either be determined in advance or be determined by NSF and NSS signals in communication. As the aforementioned image information, subpages 1-3 mentioned above are transmitted in succession. Discrimination among subpages 1-3 is made by counting the number of lines. Since the present example shows transmission of one page of an original, EOP signal (end of procedures) are sent after image information for one page of the original is transmitted. After receiving the signals, the receiver sends MCF signal (message confirmation).

Then, DCN signal (Disconnect) is sent from the transmitter, and thereby connection with communication lines is cut and communication is ended.

Figure 4:
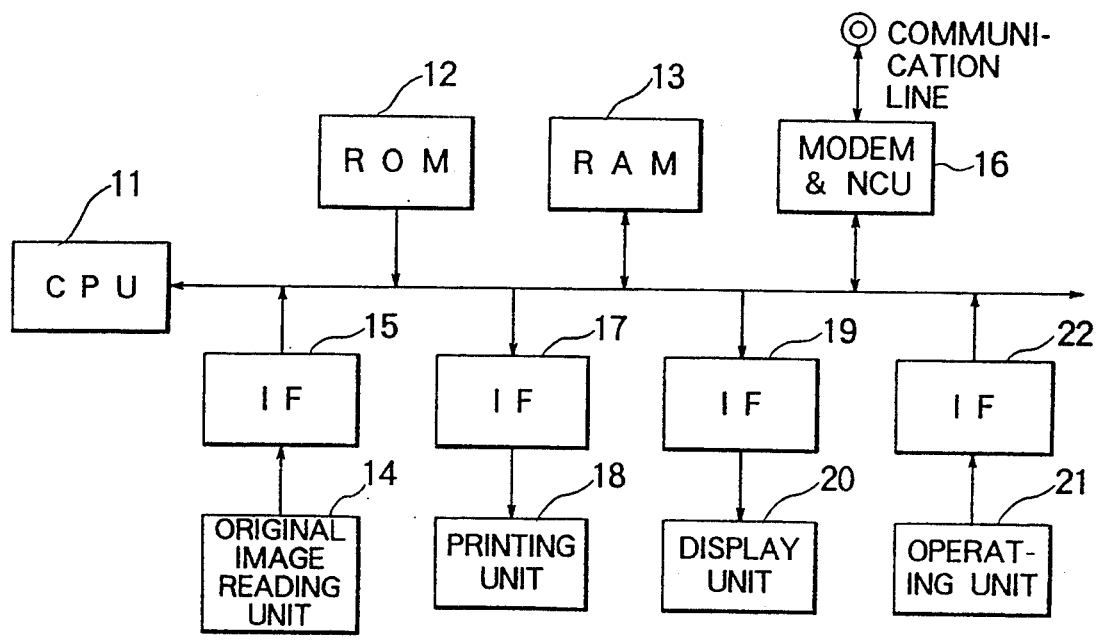
FIG. 4 is a structural diagram of the facsimile apparatus.

FIG. 4 shows the structure of the facsimile apparatus mentioned above. In the figure, the numeral 11 represents CPU that controls communication, 12 represents ROM wherein various control programs such as programs for communication are stored, and 13 represents RAM wherein image information to be transmitted are stored.

Multi-color image information read by image reading unit 14 is supplied, after being stored in RAM 13 through interface 15 or directly, to a modem and network control unit (NCU) 16 that function as a transmitting means. Multi-color image information inputted through communication lines the modem and NCU 16 is either stored in RAM 13 or is supplied directly to printing unit 18 that functions as a printer through interface 17, and contents thereof are printed on a multi-color basis or the like.

Telephone numbers and others of the other party are displayed on display unit 20 after being supplied thereto through interface 19. On operating unit 21 provided on a facsimile apparatus, there are provided a plurality of keys (not shown), and when these keys are operated, the contents thereof are taken in CPU 11 through interface 22.

Figure 5:
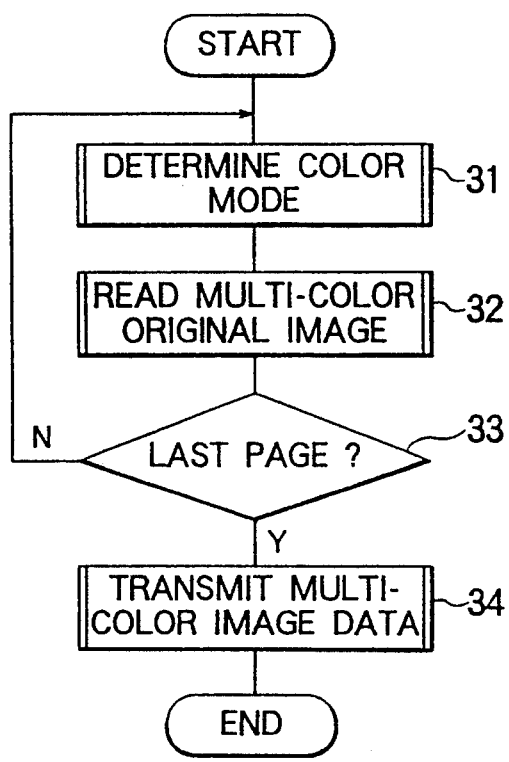
FIG. 5 is an illustration diagram illustrating transmission procedures.
Figure 6:
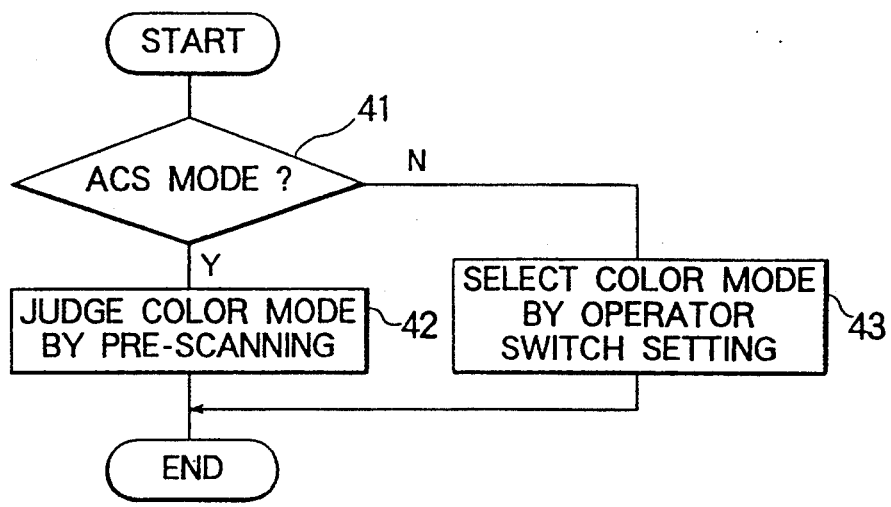
FIG. 6 is an illustration diagram illustrating color-mode-determination procedures.
Figure 7:
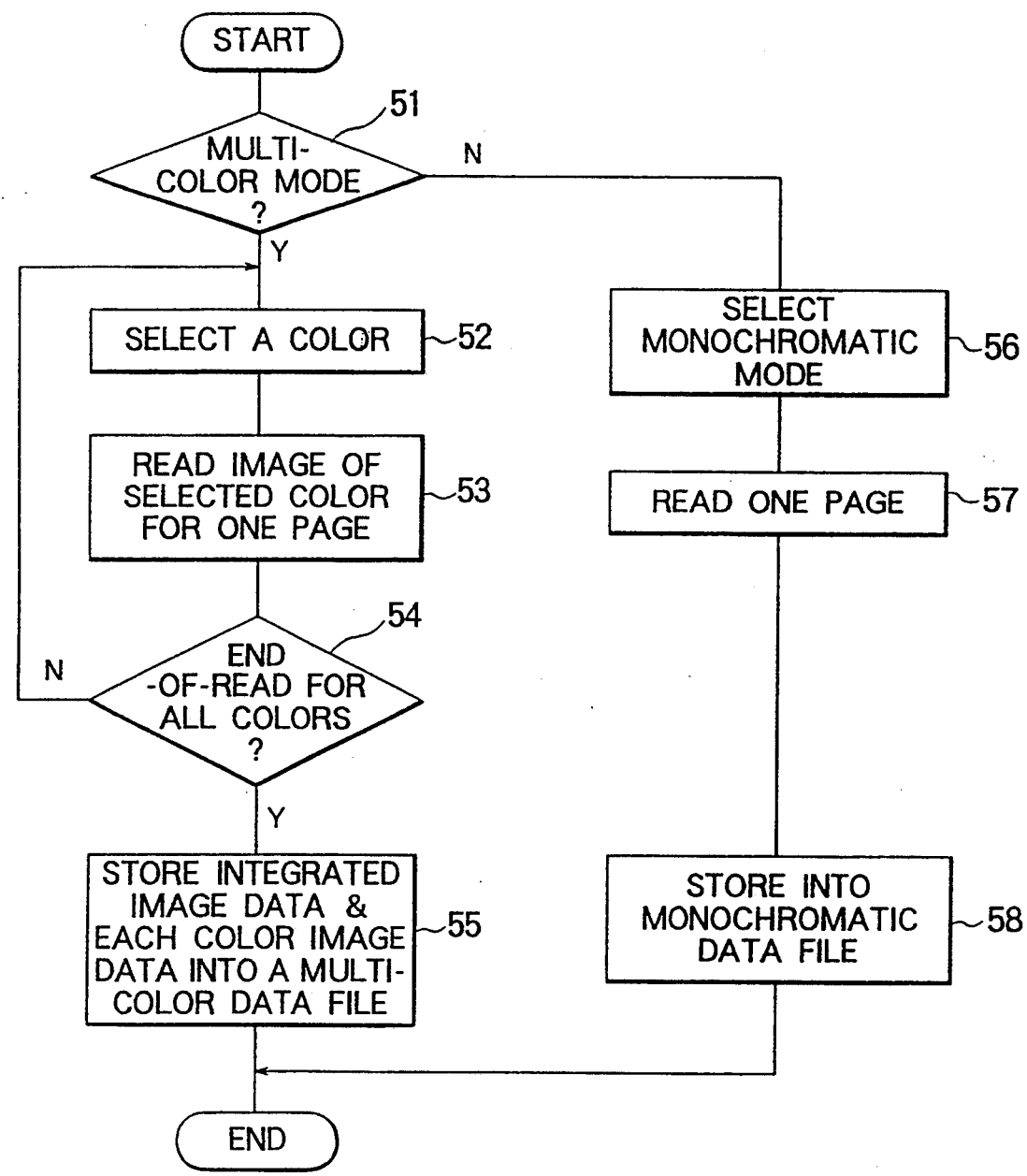
FIG. 7 is an illustration diagram illustrating multi-color image reading procedures.

FIG. 5 shows a flowchart of transmission procedure for a multi-color original described above. In the figure, a color mode determination procedure is conducted first (step 1). In the color mode determination procedure 31, a judgment is formed first for whether an ACS (automatic color selection) mode is established or not as shown in FIG. 6 (step 41), and when the ACS mode is established, a color contained in the original is then identified through prescanning, and thereby a color mode for transmission is determined to be either a multi-color mode or a monochromatic mode (step 42), thus this procedure is ended.

When it is judged that the ACS mode is not established in the step 41, a color mode is determined (step 43) by, for example, a color mode setting switch on the operating unit 21.

After a color mode has been determined in the above way, a multi-color image reading procedure in FIG. 5 (step 32) is conducted. This multi-color image reading procedure 32 is judged (step 51) whether its color mode is a multi-color mode or a monochromatic mode, and when it is a multi-color mode, a color to be read is set next (step 52). In this case, a black color is set as integrated data first.

Next, data for one page in each color are read with black (step 53) for all colors, and after that, a judgment is formed whether readings in all colors have been completed or not (step 54). Since readings have been completed only for black at this point, a blue color is set in step 52 as a color to be read next, and a blue portion of the original is read in step 53. After that, step 54 is carried out.

After red data are read next in the same way as for a blue color, integrated data in black and data in blue as well as those in red are stored in some files as multi-color data (step 55), and multi-color image reading procedure 32 is completed. These files are, for example, I file and P file. Some information of picture data, such as the number of lines for each color data are stored in the I file. In the P file, there are stored integrated data, data for a blue color and those for a red color.

When a judgment is formed for a mode to be a monochromatic mode instead of a multi-color mode in step 51, a monochromatic reading mode is set (step 56) and data for one page of the original are read in black (step 57). These data which have been read are stored in a file as monochromatic data (step 58), and this procedure is completed.

After multi-color image reading for an original has been conducted in the procedure mentioned above, a judgment is formed about whether the original is the last page or not (step 33), and when it is the last page, a procedure of multi-color image data transmission is conducted (step 34).

Figure 8:
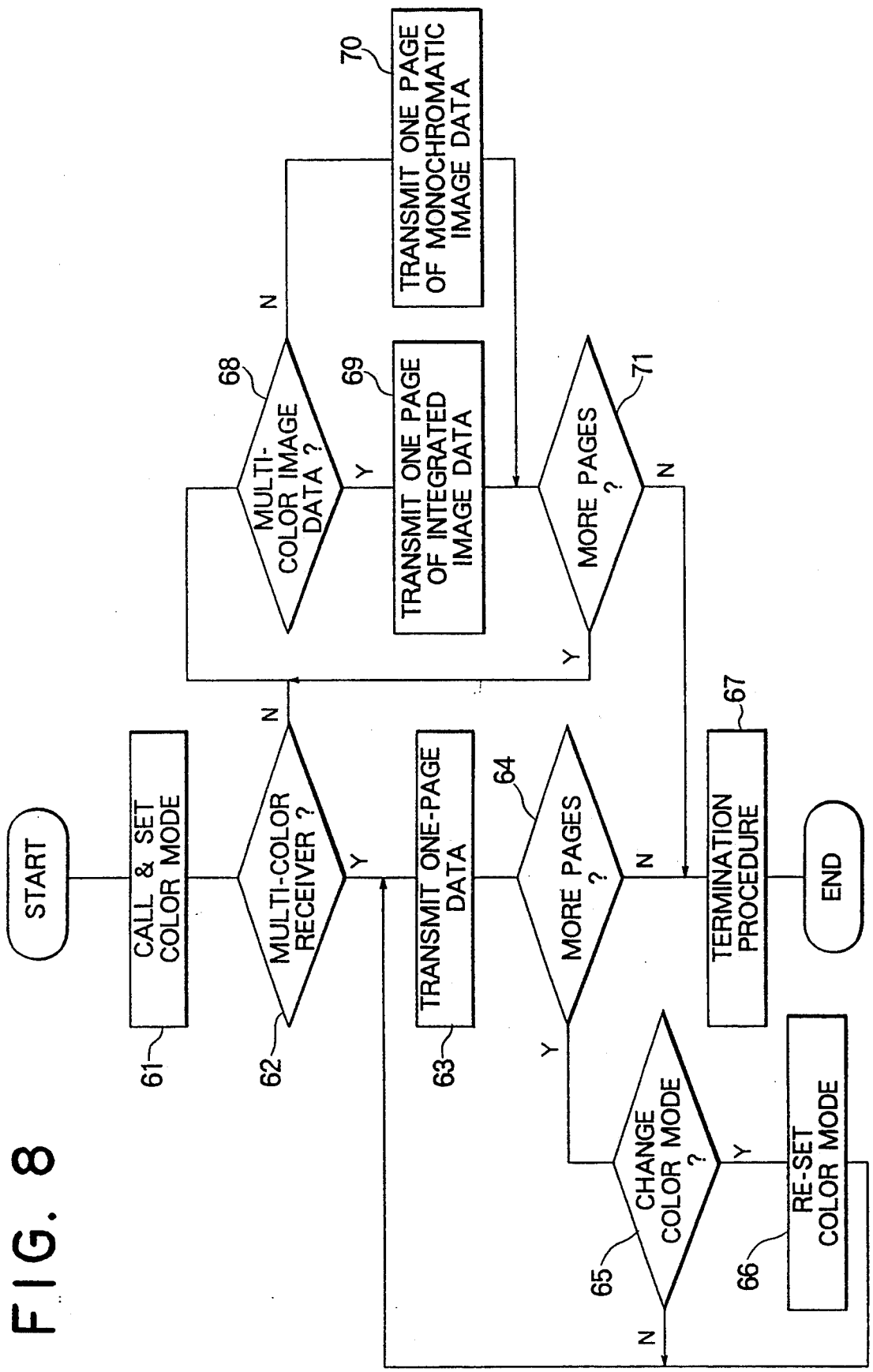
FIG. 8 is an illustration diagram illustrating multi-color image data transmission procedures.

In the multi-color image data transmission procedure 34, calling and color mode setting are conducted as shown in FIG. 8 (step 61). The color mode setting in this case is conducted based on the color mode determined in the step 31.

In the next stage, NSF signal judges whether the other party is capable of printing on a multi-color basis or not (step 62), and when it is capable of multi-color-printing, integrated data and data of each color, namely, subpages 1-3 are transmitted in succession (step 63). Then, a judgment is formed about whether the page follows or not (step 64), and when the next page follows, a judgment is formed about whether the color mode will be changed or not (step 65).

When the judgment in the above procedure says that the color mode will be changed, the color mode is set again (step 66), and then, procedures of step 63 and thereafter are repeated. On the other hand, when the judgment says that the color mode will not be changed in step 65, procedures of step 63 and thereafter are conducted.

When the judgment in step 64 says that the next page does not follow, namely, the page is the last, a transmission ending procedure is conducted (step 67), thus, the multi-color image data transmission procedure is completed.

When the judgment in step 62 says that the other party has no capability of multi-color printing, then, a judgment is formed about whether data in the file are multi-color data or not (step 68). When the data are multi-color data, integrated data only are transmitted (step 69), while when the data are not multi-color data but monochromatic data, monochromatic data for one page are transmitted (step 70).

After that, a judgment is formed about whether the next page follows or not (step 71), and when the next page follows, the procedures of step 68 and thereafter are repeated. When the next page does not follow, on the other hand, a transmission ending procedure is conducted in step 67 and this multi-color image data transmission procedure 34 is completed.

In the transmission procedures such as those described above, when all data on an original are black, for example, the time required for the communication for the original is the sum of the time required for integrated data for one page and the time required for two pages of respective colors, namely of white sheets. When all data are blue or red, the time required for communication for the original is the sum of the time required for integrated data for one page, the time required for red or blue data for one page and the time required for white sheet data for one page.

In the case of the data wherein each of black, blue and red occupies one third of the data respectively, the time required for communication is the sum of the time required for integrated data for one page and the time required for blue and red colors for about $\frac{1}{3} \times 2$ pages.

In an actual original, however, most of the original is black, for example, and blue and red are partially used in many cases. Therefore, communication time for such original that requires multi-color transmission procedure is mostly the same as that for monochromatic transmission.

In the above example, the original is read in black as integrated data and transmission therefor is conducted. However, other color may also be used for reading and for subsequent transmission. Further, it is possible to read in mixed colors and to transmit them as they are.

In the present invention, as described above, a multi-color original is divided, for being read, into integrated data and data for each color, and data thus read are transmitted to the other party so that the transmission may match multi-color printing capability of the other party.

Owing to the invention, therefore, contents of a multi-color original can be transmitted surely to all the other parties even when some of the other parties have capability for multi-color printing and the others do not.

What is claimed is:

1. A facsimile apparatus comprising:

image reading means for obtaining a set of integrated image data and a plural sets of color image data by scanning a multi-color image on an original sheet, each set of the color image data representing an image of a color in the multi-color image and the integrated image data being monochromatic image data to represent a total image formed by all colors of the multi-color image;

memory means for separately storing each set of the color image data and the integrated image data set; and transmitting means for selectively transmitting the image data stored in the memory means to a receiving station, wherein the transmitting means transmits the integrated image data and prohibits each set of the color image data from being transmitted when the receiving station is not provided with multi-color printing capability.

2. The facsimile apparatus of claim 1, further comprising:

manual selection means for selecting therewith a color mode between a multi-color mode and a monochromatic mode, wherein in a case when the monochromatic mode is selected, the image reading means obtains only one set of monochromatic image data the memory means and the transmitting means transmits only the same monochromatic image data.

3. The facsimile apparatus of claim 2, further comprising:

automatic color mode selection means for determining the color mode by pre-scanning the original image; and a selection switch for selecting one mode between an automatic mode to prohibit functioning of the manual selection means and a manual mode to prohibit functioning of the automatic color mode selection means.

* * * * *

UNITED STATES PATENT AND TRADEMARK OFFICE
CERTIFICATE OF CORRECTION

PATENT NO. : 5,361,143
DATED : November 01, 1994
INVENTOR(S) : Tsutomu NAKAYAMA et al.

It is certified that error appears in the above-indentified patent and that said Letters Patent is hereby corrected as shown below:

Title page, item [57],
Abstract, line 7, change "Memeory" to --Memory--.

Claim 1, column 6, line 19 delete "a".

Claim 2, column 6, line 44, after "data" insert --,--.

Signed and Sealed this

Ninth Day of May, 1995

Attest:

BRUCE LEHMAN

Attesting Officer

Commissioner of Patents and Trademarks